United States Patent

Bucceri

[15] 3,643,984
[45] Feb. 22, 1972

[54] PLASTIC COATED FERRULE FOR A TUBE COUPLING

[72] Inventor: Bernard J. Bucceri, Erie, Pa.
[73] Assignee: Autoclave Engineers, Inc., Erie, Pa.
[22] Filed: Sept. 10, 1969
[21] Appl. No.: 856,711

[52] U.S. Cl. .......................... 285/94, 285/341, 285/382.7, 285/DIG. 10
[51] Int. Cl. .................................................. F16l 19/08
[58] Field of Search .................. 277/235; 285/55, 341, 342, 285/382.7, DIG. 10, 111, 94

[56] References Cited

UNITED STATES PATENTS

| 3,092,405 | 6/1963 | Wurzburger | 285/382.7 X |
| 3,127,196 | 3/1964 | Fabian et al. | 285/111 |
| 3,490,777 | 1/1970 | Emmerson | 277/235 X |
| 3,498,646 | 3/1970 | DePuy | 285/341 X |
| 3,239,247 | 3/1966 | Pickert | 285/94 |

FOREIGN PATENTS OR APPLICATIONS

| 818,587 | 6/1937 | France | 285/382.7 |

Primary Examiner—David J. Williamowsky
Assistant Examiner—David H. Corbin
Attorney—Webb, Burden, Robinson & Webb

[57] ABSTRACT

A plastic coated, positive-bite-type ferrule for a high-pressure tube coupling including cooperating body and closure members which engage the plastic coated ferrule therebetween to seal the coupling.

3 Claims, 1 Drawing Figure

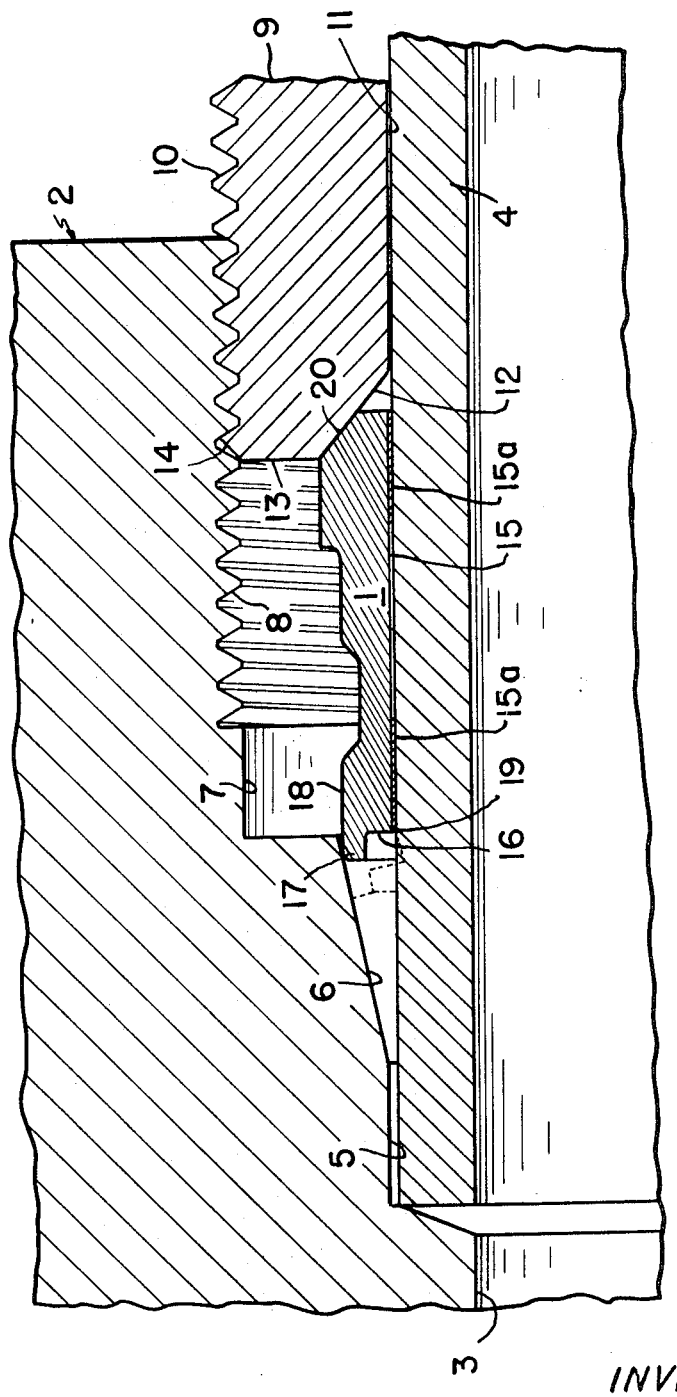

PLASTIC COATED FERRULE FOR A TUBE COUPLING

This invention relates to a tube coupling and particularly to a coupling including a sleeve or ferrule, and useful for a high-pressure tube coupling.

Sleeve- or ferrule-type tube couplings generally comprise a body having a bore for receiving an end of a length of tubing. This body bore includes a flared portion which is suitably shaped to engage an end of a sleeve or ferrule which is slidably mounted on the tubing. A closure member is threadably secured to the body and adapted to be tightened to compress the ferrule and seat it securely in the body to seal the coupling.

A major factor tube in coupling seal failure has been the inability to closely control the torque required to properly seat the ferrule in the tube coupling. Proper seating is a direct function of the amount of torque, i.e., the tighter the seal desired, the greater the amount of torque applied. Excessive torque results in adverse mechanical stress being put on the thread connection between the body and closure member, and wears and galls the threads to such an extent that the coupling, once made, cannot be opened and resealed.

Additionally, excessive torquing of the coupling results in the lead or biting end of the ferrule itself being galled or collapsed and destroyed before a proper seal is obtained. As a corrollary, however, reducing the torque applied to the closure member may result in improper ferrule seating and lead to immediate or early failure of the coupling.

To limit the torque applied to an amount consistent with thread life of the connection and to eliminate galling of the coupling elements, I have invented a plastic coated sleeve or ferrule which is adapted to be compressed between cooperating body and closure coupling members in a high pressure tubing bite-type connection. I have discovered that the plastic coated ferrule not only improves thread life and avoids galling since less torque is required to seal the coupling permitting the connection to be resealed many times, but surprisingly facilitates proper seating of the ferrule within the coupling and allows the leading or biting edge of the ferrule to cut deeper into the tubing wall resulting in a more efficient sealed coupling.

The art has employed dissimilar materials for the sleeve, body and tubing in an effort to avoid electrolytic action between the coupling elements. This has often reduced the life of the ferrule, particularly in corrosive environments where certain of the ferrule materials have been severely chemically attacked. The same materials can be used for all elements of my coupling.

The plastic coating used on my ferrule should be characterized by high lubricity and be substantially inert relative to the elements of the connection as well as to fluids with which it may come in contact in application. I have used and prefer a tetrafluoroethylene polymer manufactured by E. I. du Pont de Nemours and Company under the trademark "Teflon-S." Properly applied and cured in accordance with the method of coating hereinafter disclosed, this material exhibits satisfactory characteristics for use in sleeve or ferrule-type tube couplings.

In the accompanying drawing, I have shown in longitudinal cross section one-half of a typical sleeve- or ferrule-type coupling including a plastic coated ferrule 1 in accordance with my invention. The coupling comprises a body 2 having an axial passageway 3 for channeling fluid through the body from or into a length of tubing 4 which is positioned in a receiving bore 5 of the body and in communication with passageway 3. The mouth of the receiving bore 5 is flared outwardly forming a frustoconical surface 6. An axial bore 7 extends from the mouth to the outer wall of the body. A major portion of the bore 7 carries internal threads 8. A closure member or gland nut 9, having external threads 10, is positioned on tubing 4 and threadably engaged to the threads 8 of the bore. The gland nut includes a central bore 11 having a diameter slightly greater than the outer diameter of the tubing 4 so that the tubing 4 can pass through bore 11. A flared surface 12 is also formed on the inner wall 13 of the gland nut. A chamfer 14 is provided on the end of the gland nut to facilitate threading the nut into the body bore 7.

A hollow sleeve or ferrule 1, according to may invention, is mounted on the tubing 4 and is adapted for compression, upon tightening of the gland nut into the body, between the surface 6 of the body and the flared surface 12 of the gland nut. Bore 15 of the ferrule closely fits around the tubing 4. The leading end of the ferrule 1 includes an annular recess 16 forming a thin annular extension 17 which carries an external sealing surface 18. The intersection of the bore 15 and the recess 16 defines a sharp annular edge 19. The leading end of the ferrule shown in solid lines illustrates its position when the ferrule is not under compression. The dotted lines show the position of the leading end when the ferrule is advanced under compression by torquing the gland nut into the body, for example, when the gland nut is "fingertight." The trailing end of the ferrule 1 also includes a frustoconical sealing surface 20 for engaging the gland nut surface 12 upon tightening of the gland nut into the body. As the nut is threaded into the body, the ferrule 1 is compressed tightly between the flared surfaces 6, 12, and the sharp edge 19 of the ferrule bites into the tubing to effect a positive seal through the tube coupling.

I have found through extensive comparative testing that excessive torque is required, attended by the problems previously set forth, to obtain this positive biting engagement when a dry or uncoated sleeve or ferrule is used. Further, I have discovered that these problems can be substantially eliminated by applying to the ferrules a plastic coating 15a, preferably "Teflon-S," according to the following method:

The ferrule, preferably of stainless steel material, is first surface treated by sandblasting and subsequently is fire cleaned. Tetrafluorethylene polymer material, specifically "Teflon-S," is then applied to the exterior surfaces of the ferrule using a controlled spray technique well known in the art. The coating 15a extends around the biting edges of the ferrule at each end and extends a short distance into the bore. The center portion of the inside wall or bore 15 of the ferrule 1 is not coated. A coating of approximately 2 mil thickness has been found satisfactory.

Those skilled in the art will appreciate that the curing schedule for a plastic coating depends upon the quality of the coating and bonding required to withstand the environmental conditions to which the coated ferrule will be exposed. I have found that ferrules baked for 15 minutes at approximately 400° F. and then for 20 minutes at 650° F. to insure proper bonding and curing of the plastic coating are particularly suitable for use under conditions of moderate abrasion where operating temperatures do not exceed 500° F.

Tests have shown that less torque is required to effect a positive seal with my plastic coated ferrule than with an uncoated ferrule in the same tube coupling. Moreover, with plastic coated ferrules, according to my invention, less stress is placed on the bearing areas of the coupling elements, and galling is substantially eliminated. A considerable saving in assembly time is realized by using plastic coated ferrules instead of uncoated ferrules, since the use of mandrels and lubrication compounds, previously needed for assembly of the coupling, are not required. Below are the pertinent procedures used and the results obtained from these tests:

a. Four drop forged valve fitting incorporating uncoated 316 CW ferrules of each of one-fourth, three-eighths and one-half inch sizes were assembled on 304 SS annealed tubing with gland nuts initially positioned at fingertightness. Torque was applied to tighten each of the nuts to a position 1¼ turns past fingertightness. The torque required to tighten was recorded at one-fourth turn intervals during assembly. Each assembly was then checked for leakage, using nitrogen, at its own working pressure; each assembly was also proof checked and burst with water. Proof and bursting pressures were recorded.

b. Four drop forged valve fittings have uncoated 17-4Ph ferrules of each of one-fourth, three-eighths and one-half inch sizes were assembled on 304 SS annealed tubing with the gland nuts initially fingertight. The nuts were then torqued to a position 1¼ turns past finger tightness. Torquing and proof testing were carried out as in (a) above and recorded.

c. Four drop forged valve fitting incorporating 316 CW plastic coated ferrules, in accordance with my invention, of each of one-fourth, three-eighths, and one-half inch sizes were assembled on 304 SS annealed tubing, torque tested, leak and burst tested following the procedures set forth in (a) above. The torque to tighten was recorded at one-fourth turn intervals. Proof and bursting pressures were also recorded.

d. Four drop forged valve fittings having 17-4Ph ferrules, plastic coated in accordance with my invention, of each of one-fourth, three-eighths and one-half inch sizes were assembled on 304 SS annealed tubing following the procedure set forth in (a) above. Torque, proof and burst pressure data was recorded.

Tables I-VI below give the data obtained from the torquing tests. The observations made during the tests and the results shown for uncoated and my plastic coated ferrules based upon the data obtained are set forth below in each Table.

Tests were also performed to evaluate the expansion of the male thread on the drop forged fitting when using uncoated ferrules and ferrules plastic coated in accordance with my invention. Four fittings of each size one-fourth, three-eighths and one-half inch with uncoated ferrules and ferrules having my plastic coating were assembled on 304 SS annealed tubing. Dimensioned measurements of the threaded connection were made and recorded before assembly and at every one-fourth turn past finger tightness. The data recorded also appears on Tables I-VI. In general, the results of this test show that the threads of the tube coupling were stressed more using uncoated ferrules over plastic coated ferrules.

TABLE I
316 CW ferrules — ¼" x ⅛". 304 SS tubing 80B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
|---|---|---|---|---|
| Uncoated: | | | | |
| ¼-1¼ | 50-480 | 56,000 | .556 | .557 |
| ¼-1¼ | 50-480 | 54,000 | .556 | .557 |
| ¼-1¼ | 50-475 | 54,000 | .556 | .557 |
| ¼-1¼ | 50-480 | 54,000 | .556 | .557 |
| Average | 50-479 | | | |
| With plastic coating: | | | | |
| ¼-1¼ | 62-480 | 56,000 | .557 | .559 |
| ¼-1¼ | 60-420 | 56,000 | .557 | .559 |
| ¼-1¼ | 50-410 | 56,000 | .557 | .5575 |
| ¼-1¼ | 60-440 | 59,000 | .556 | .558 |
| Average | 58-437 | | | |

The torque for four assemblies ranged between 50 and 479 in. lbs. There was no leakage during proofs. The average tube burst at 55,000 psi.

TABLE II
316 CW Ferrules — ⅜" x ¼". 304 SS Tubing 84B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
|---|---|---|---|---|
| Uncoated: | | | | |
| ¼-1¼ | 124-1260 | 35,000 | .679 | .682 |
| ¼-1¼ | 100-1200 | 35,000 | .678 | .681 |
| ¼-1¼ | 120-1220 | 35,000 | .682 | .685 |
| ¼-1¼ | 125-1250 | 36,000 | .682 | .686 |
| Average | 117-1233 | | | |
| With plastic coating: | | | | |
| ¼-1¼ | 78-640 | 34,000 | .678 | .680 |
| ¼-1¼ | 90-840 | 34,000 | .678 | .681 |
| ¼-1¼ | 85-625 | 34,000 | .682 | .6835 |
| ¼-1¼ | 82-850 | 34,000 | .683 | .685 |
| Average | 84-739 | | | |

The torque for four assemblies ranged between 58 and 437 in. lbs. There was no leakage during proofs. The average tube burst at 55,000 psi.

TABLE III
316 CW Ferrules — ½" x ⅜". 304 SS Tubing 74B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
|---|---|---|---|---|
| Uncoated: | | | | |
| ¼-1¼ | 135-1440 | 28,000 | .807 | .809 |
| ¼-1¼ | 135-1440 | 27,000 | .810 | .812 |
| ¼-1¼ | 139-1430 | 27,000 | .808 | .811 |
| ¼-1¼ | 140-1450 | 27,000 | .808 | .812 |
| Average | 137-1440 | | | |
| With plastic coating: | | | | |
| ¼-1¼ | 80-840 | 28,000 | .807 | .8085 |
| ¼-1¼ | 80-840 | 28,000 | .808 | .810 |
| ¼-1¼ | 80-840 | 28,000 | .806 | .809 |
| ¼-1¼ | 80-820 | 27,000 | .808 | .810 |
| Average | 80-835 | | | |

The results for ½" sleeves followed the exact pattern as the ⅜" sleeve, above except for torque.

TABLE IV
17-4 Ph Ferrules — ¼" x ⅛". 304 SS Tubing 80B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
|---|---|---|---|---|
| Uncoated: | | | | |
| ¼-1¼ | 88-360 | 56,000 | .556 | .557 |
| ¼-1¼ | 104-540 | 56,000 | .556 | .561 |
| ¼-1¼ | 89-480 | 56,000 | .556 | .559 |
| ¼-1¼ | 103-520 | 56,000 | .556 | .560 |
| Average | 96-475 | | | |
| With plastic coating: | | | | |
| ¼-1¼ | 73-420 | 55,000 | .557 | .558 |
| ¼-1¼ | 73-420 | 55,000 | .557 | .5585 |
| ¼-1¼ | 73-430 | 55,000 | .557 | .559 |
| ¼-1¼ | 73-420 | 56,000 | .557 | .559 |
| Average | 73-423 | | | |

The torque for four assemblies ranged between 73 and 423 in. lbs. for my plastic coated sleeve, and 96 to 475 in. lbs. for the uncoated sleeves. There was no leakage with the plastic coated sleeves, although two connections having uncoated ferrules leaked because of galling of materials at the seating area.

TABLE V
17-4 Ph Ferrules — ⅜" x ¼". 304 SS Tubing 84B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
|---|---|---|---|---|
| Uncoated: | | | | |
| ¼-1¼ | 170-1500 | 35,000 | .680 | .687 |
| ¼-1¼ | 130-1020 | 35,000 | .680 | .686 |
| ¼-1¼ | 150-1420 | 35,000 | .682 | *.690 |
| ¼-1¼ | 160-1500 | 35,000 | .682 | .688 |
| Average | 151-1360 | | | |
| With plastic coating: | | | | |
| ¼-1¼ | 104-720 | 35,000 | .678 | .682 |
| ¼-1¼ | 108-720 | 35,000 | .678 | .682 |
| ¼-1¼ | 108-710 | 35,000 | .678 | .683 |
| ¼-1¼ | 106-710 | 35,000 | .678 | .684 |
| Average | 107-715 | | | |

The torque for the four each assemblies ranged between 84 and 739 in. lbs. for the 316 CW uncoated sleeves. The torque for the four each of the assemblies ranged between 107 and 715 in. lbs. for the coated sleeves, and 151 to 1,360 for the uncoated sleeves. There was no leakage with the coated sleeves, but one assembly (*) did leak gas at its own working pressure of 6,000 psi.

TABLE VI

17–4 Ph Ferrules—½" x ⅜". 304 SS Tubing 74B Brinnell. Proof (N₂) 6,000 p.s.i./Proof (H₂O) 12,000 p.s.i.

| Turn valve | Torque in pounds | Burst (H₂O) 24,000 min. | Thread dia. before make-up | Thread dia. after make-up |
| --- | --- | --- | --- | --- |
| Uncoated: | | | | |
| ¼–1¼ | 164–1260 | 27,000 | .808 | .812 |
| ¼–1¼ | 154–1440 | 27,000 | .810 | .814 |
| ¼–1¼ | 160–1420 | 27,000 | .807 | .811 |
| ¼–1¼ | 160–1430 | 27,000 | .807 | .812 |
| Average | 135–1388 | | | |
| With plastic coating: | | | | |
| ¼–1¼ | 120–1020 | 26,000 | .809 | .813 |
| ¼–1¼ | 120–1020 | 26,000 | .809 | .8135 |
| ¼–1¼ | 110–990 | 26,000 | .806 | .809 |
| ¼–1¼ | 120–1020 | 28,000 | .808 | .813 |
| Average | 118–1013 | | | |

The results for ½" sleeves followed the exact pattern as the ⅜" sleeve, except for torque.

The temperature characteristics of a plastic coated ferrule, according to my invention, were also determined by testing each of the fitting sizes one-fourth three-eighths and one-half inch at 500° F. and 800° F. Torques were applied when cold and recorded. Table VII shows the data obtained. In every case, after the test, the fitting was disassembled and the coating was observed to be satisfactory.

TABLE VII

| Size | Torque (ft./lb.) before | Torque (ft./lb.) after |
| --- | --- | --- |
| At 500° F.: | | |
| ¼" O.D. x ⅛" I.D. seamless tubing | 36 | 31 |
| ⅜" O.D. x ¼" I.D. seamless tubing | 60 | 60 |
| ½" O.D. x ⅜" I.D. seamless tubing | 85 | 70 |
| At 800° F.: | | |
| ¼" O.D. x ⅛" I.D. seamless tubing | 36 | 50 |
| ⅜" O.D. x ¼" I.D. seamless tubing | 60 | 90 |
| ½" O.D. x ⅜" I.D. seamless tubing | 85 | 115 |

From the foregoing data, it is apparent that several advantages are obtained from use of my plastic coated ferrule over uncoated ferrules known to the art. Specifically, less torque is required to properly assemble a fitting incorporating my plastic coated ferrule than one having an uncoated ferrule. Based upon the data herein, in some cases the torque required is reduced as much as 50 percent relative to uncoated ferrule fittings. Reduced torque requirements enable the assembler to advance the sealing gland nut the proper distance along a tubing into a body without excessive force and possible damage to the gland or body threads. This reduced torque also avoids galling of the threads and ferrule enabling the assembly to be opened and resealed a number of times. Finally, a more efficient coupling is obtained using my plastic coated ferrule over a coupling having an uncoated ferrule. Reduced friction in my ferrule assembly permits the leading edge of the ferrule to bite or cut deeper into the tubing wall than do ferrules now in use providing a positive seal in my coupling.

Particularly, I have discovered that a ferrule properly plastic coated with Teflon according to my method achieves all of the foregoing advantages and the specific method of providing a Teflon ceramic coating as disclosed herein should be considered a preferred form of the invention.

I claim:

1. In a fitting for a high-pressure tubing including a body member having an opening for receiving an end of a length of tubing, a closure member surrounding the tubing and adapted to be threadably secured to the body member, each of said body and closure members being provided with opposed substantially frustoconical flared surfaces, the improvement comprising a metallic ferrule means, having a bore therethrough and sealing surfaces, one at each end for mating with said flared surfaces of the body and closure member and surrounding the tubing between the opposed flared surfaces, adapted to be compressed between the members upon threadably tightening the closure into the body member, whereby tightening of the closure into the body member advances the ferrule along the tubing to force the sealing surfaces into face-to-face engagement with the flared surfaces, said engagement causing a portion of a sealing surface to bite into the tubing to effect a fluid seal through the fitting, a plastic coating being bonded to the ferrule means on its exterior surface and extending at least a short distance into each end of the bore, said plastic coating being characterized by high lubricity and substantial inertness to its environment.

2. The improvement as set forth in claim 1 in which an end of the ferrule means includes a circumferential extension which carries one of the sealing surfaces and defines a recess which terminates in a sharp annular edge adjacent the tubing, said engagement causing the sharp edge to bite into the tubing.

3. The improvement in a ferrule means as set forth in claim 1 in which plastic coating is tetrafluoroethylene copolymer material.

* * * * *